United States Patent
Ogata et al.

(10) Patent No.: US 10,928,232 B2
(45) Date of Patent: Feb. 23, 2021

(54) THERMAL AIR FLOW METER

(71) Applicant: Hitachi Automotive Systems, Ltd., Hitachinaka (JP)

(72) Inventors: Masatoshi Ogata, Tokyo (JP); Norio Ishitsuka, Tokyo (JP); Takayuki Yogo, Ibaraki (JP); Hiroaki Hoshika, Ibaraki (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 285 days.

(21) Appl. No.: 15/519,452

(22) PCT Filed: Sep. 24, 2015

(86) PCT No.: PCT/JP2015/076833
§ 371 (c)(1),
(2) Date: Apr. 14, 2017

(87) PCT Pub. No.: WO2016/072166
PCT Pub. Date: May 12, 2016

(65) Prior Publication Data
US 2017/0241820 A1    Aug. 24, 2017

(30) Foreign Application Priority Data
Nov. 6, 2014   (JP) .............................. JP2014-225706

(51) Int. Cl.
*G01F 1/696* (2006.01)
*G01F 15/00* (2006.01)
(Continued)

(52) U.S. Cl.
CPC ....... *G01F 1/696* (2013.01); *F02M 35/10386* (2013.01); *G01F 1/684* (2013.01);
(Continued)

(58) Field of Classification Search
CPC ... F02M 35/10386; G01F 1/684; G01F 15/14; G01F 1/68; G01F 1/6847; G01F 1/6842; G01F 15/006
(Continued)

(56) References Cited

U.S. PATENT DOCUMENTS

| 4,381,668 | A | 5/1983 | Sato et al. |
| 5,440,924 | A | 8/1995 | Itsuji et al. |

(Continued)

FOREIGN PATENT DOCUMENTS

| CN | 1437697 A | 8/2003 |
| CN | 101246027 A | 8/2008 |

(Continued)

OTHER PUBLICATIONS

English machine translation for Document JP 2011-119500.*
(Continued)

*Primary Examiner* — Daniel S Larkin
*Assistant Examiner* — Anthony W Megna Fuentes
(74) *Attorney, Agent, or Firm* — Crowell & Moring LLP

(57) ABSTRACT

The purpose is to improve the measurement accuracy of a thermal air flow meter. The device has: an auxiliary passage for entraining a portion of a fluid being measured; a sensor chip arranged in the auxiliary passage, for measuring the flow rate of the fluid being measured; an electronic component having an internal resistor, for converting the fluid flow rate detected by the sensor chip to an electrical signal; and a substrate on which the sensor chip and the electronic component are mounted. The substrate is covered by a filler material, on the surface of which the electronic component is mounted.

9 Claims, 11 Drawing Sheets

(51) Int. Cl.
 *F02M 35/10* (2006.01)
 *G01F 1/684* (2006.01)
 *G01F 15/02* (2006.01)

(52) U.S. Cl.
 CPC .......... *G01F 1/6842* (2013.01); *G01F 15/006* (2013.01); *G01F 15/02* (2013.01)

(58) Field of Classification Search
 USPC ........................................ 73/204.11–204.27
 See application file for complete search history.

(56) References Cited

U.S. PATENT DOCUMENTS

| | | | |
|---|---|---|---|
| 6,070,462 | A | 6/2000 | Igarashi et al. |
| 6,516,785 | B1 | 2/2003 | Nakada et al. |
| 6,779,393 | B1 | 8/2004 | Muller et al. |
| 2001/0023983 | A1 | 9/2001 | Kobayashi et al. |
| 2001/0027683 | A1 | 10/2001 | Igarashi et al. |
| 2002/0092349 | A1 | 7/2002 | Watanabe et al. |
| 2003/0084718 | A1 | 5/2003 | Igarashi et al. |
| 2003/0209067 | A1 | 11/2003 | Igarashi et al. |
| 2003/0233886 | A1 | 12/2003 | Uramachi et al. |
| 2004/0055376 | A1 | 3/2004 | Thompson et al. |
| 2004/0177684 | A1 | 9/2004 | Igarashi et al. |
| 2006/0112763 | A1 | 6/2006 | Uramachi et al. |
| 2008/0264165 | A1 | 10/2008 | Abe et al. |
| 2010/0031742 | A1 | 2/2010 | Muziol et al. |
| 2011/0140211 | A1 | 6/2011 | Kono et al. |
| 2011/0179871 | A1 | 7/2011 | Misawa et al. |
| 2011/0296904 | A1 | 12/2011 | Tagawa et al. |
| 2012/0000280 | A1* | 1/2012 | Kishikawa ............ G01F 1/6842 73/204.22 |
| 2013/0192388 | A1 | 8/2013 | Kono et al. |
| 2014/0109691 | A1 | 4/2014 | Kono et al. |
| 2014/0190273 | A1 | 7/2014 | Kono et al. |
| 2015/0122012 | A1 | 5/2015 | Tokuyasu et al. |
| 2015/0137282 | A1 | 5/2015 | Kono et al. |
| 2016/0025539 | A1 | 1/2016 | Ogata et al. |
| 2016/0146651 | A1 | 5/2016 | Isoya et al. |
| 2017/0363455 | A1 | 12/2017 | Tokuyasu et al. |
| 2018/0073905 | A1 | 3/2018 | Kono et al. |
| 2019/0162569 | A1 | 5/2019 | Tokuyasu et al. |

FOREIGN PATENT DOCUMENTS

| | | | |
|---|---|---|---|
| CN | 102162774 | A | 8/2011 |
| CN | 103791956 | A | 5/2014 |
| CN | 105324644 | A | 2/2016 |
| DE | 102 17 883 | A1 | 11/2003 |
| DE | 103 44 493 | A1 | 5/2004 |
| DE | 10 2010 049 118 | A1 | 1/2012 |
| EP | 1 319 929 | A1 | 6/2003 |
| EP | 1 790 954 | A2 | 5/2007 |
| EP | 2 154 493 | A2 | 2/2010 |
| EP | 2 339 302 | A2 | 6/2011 |
| EP | 2 629 065 | A1 | 8/2013 |
| EP | 3 026 402 | A1 | 6/2016 |
| EP | 3 203 195 | A1 | 8/2017 |
| JP | 56-30616 | A | 3/1981 |
| JP | 62-152198 | A | 7/1987 |
| JP | 6-207842 | A | 7/1994 |
| JP | 8-62009 | A | 3/1996 |
| JP | 8-338279 | A | 12/1996 |
| JP | 10-38608 | A | 2/1998 |
| JP | 11-163002 | A | 6/1999 |
| JP | 2000-46608 | A | 2/2000 |
| JP | 2001-12987 | A | 1/2001 |
| JP | 2001-15649 | A | 1/2001 |
| JP | 2001-244376 | A | 9/2001 |
| JP | 2002-318146 | A | 10/2002 |
| JP | 2002-318147 | A | 10/2002 |
| JP | 2003-270016 | A | 9/2003 |
| JP | 2004-28631 | A | 1/2004 |
| JP | 2006-153694 | A | 6/2006 |
| JP | 2009-31067 | A | 2/2009 |
| JP | 2010-96614 | A | 4/2010 |
| JP | 2010-112804 | A | 5/2010 |
| JP | 2010-133829 | A | 6/2010 |
| JP | 2010-204005 | A | 9/2010 |
| JP | 2011-119500 | A | 6/2011 |
| JP | 2011-122984 | A | 6/2011 |
| JP | 201 1-1 7491 | | 9/2011 |
| JP | 2011-252796 | A | 12/2011 |
| JP | 2012-15222 | A | 1/2012 |
| JP | 2012-32320 | A | 2/2012 |
| JP | 2013-24822 | A | 2/2013 |
| JP | 2013-170997 | A | 9/2013 |
| JP | 2014-1976 | A | 1/2014 |
| JP | 2014-102219 | A | 6/2014 |
| JP | 2014-173960 | A | 9/2014 |
| KR | 10-0740019 | B1 | 7/2007 |
| MX | 2012003145 | A | 9/2012 |
| WO | WO 99/14560 | A1 | 3/1999 |
| WO | WO 02/10694 | A1 | 2/2002 |
| WO | WO 2012/049934 | A1 | 4/2012 |
| WO | WO 2013/186910 | A1 | 12/2013 |

OTHER PUBLICATIONS

"Engineering Materials," the Engineering ToolBox, https://www.engineeringtoolbox.com/engineering-materials-properties-d html PDF, retrieved with the date of Jan. 7, 2012 using WayBack Machine.*
International Search Report (PCT/ISA/210) issued in PCT Application No. PCT/JP2015/076833 dated Jan. 19, 2016 with English translation (six (6) pages).
Japanese-language Written Opinion (PCT/ISA/237) issued in PCT Application No. PCT/JP2015/076833 dated Jan. 19, 2016 (four (4) pages).
Japanese-language Office Action issued in counterpart Japanese Application No. 2014-225706 dated Jul. 17, 2018 with unverified English translation (six pages).
Extended European Search Report issued in counterpart European Application No. 15856909.5 dated Aug. 1, 2018 (eight pages).
Communication pursuant to Rule 114(2) EPC issued in counterpart European Application No. 15856909.5 dated Aug. 8, 2018 (11 pages).
European Communication pursuant to Rule 114(2) EPC issued in counterpart European Application No. 15856909.5 dated Jan. 4, 2019 (three (3) pages).
Cover page of EP 0 938 648 A1 published Sep. 1, 1999 (one (1) page).
Japanese-language Presentation of Publications issued in counterpart Japanese Application No. 2014-225706 dated Oct. 22, 2018 with English translation (11 pages).
Okada Y., "Study on Inventive Step, Novelty and Description Requirements under Japanese Patent Law (2)—Focusing on Inventions with Numerical Range Limitations" Patent Studies, Sep. 30, 2006, pp. 21-43, No. 42, (12 pages).
"Test Method for Young's modulus of Metallic Materials at Elevated Temperature" JIS Z2280, Feb. 1, 1993, (four (4) pages).
Mitani, Y., "About Measurement Technology of Young's Modules", IIC Review, Apr. 2010, pp. 30-34, No. 43, (three (3) pages).
Communication pursuant to Rule 114(2) EPC issued in counterpart European Application No. 15856909.5 dated Feb. 4, 2019 (three (3) pages).
Mirnezhad M., "Effect of Temperature on Young's Modulus of Graphene", Journal of Thermal Stresses, Aug. 8, 2012, pp. 913-920, vol. 35, Issue 10, Taylor & Francis Group (nine (9) pages).
Li W., "A Model of Temperature-Dependent Young's Modulus for Ultrahigh Temperature Ceramics" Physics Research International, Jan. 2, 2011, pp. 1-3, vol. 2011, Hindawi (three (3) pages).
Japanese Presentation of Publications issued in counterpart Japanese Application No. 2014-225706 dated Jan. 31, 2019 with English translation (12 pages).
Yoshioka T., "Elastic Modulus of Ceramics at Elevated Temperature" Journal of the Ceramic Society of Japan, Mar. 14, 1995, pp. 598-602, vol. 6 (three (3) pages).

(56) References Cited

OTHER PUBLICATIONS

"Preparation of Leucite Ceramic and Its High Thermal Expansion", cited in Japanese Presentation of Publications dated Jan. 31, 2019 (seven (7) pages).

Communication pursuant to Rule 114(2) EPC issued in counterpart European Application No. 15856909.5 dated Oct. 25, 2018 (three (3) pages).

Communication pursuant to Rule 114(2) issued in counterpart European Application No. 15856909.5 dated Oct. 5, 2018 (three (3) pages).

Third Party Observation issued in counterpart European Application No. 15856909.5 dated Feb. 28, 2019 (three (3) pages).

Third Party Observation issued in counterpart European Application No. 15856909.5 dated Mar. 19, 2019 (two (2) pages).

European Communication pursuant to Rule 114(2) EPC issued in counterpart European Application No. 15856909.5 dated May 27, 2019 (three (3) pages).

"Fine Ceramics for Electronics," the New Value Frontier Kyocera, 2018 Kyocera Corporation, pp. 1-40 (40 pages).

"Coefficients of Linear Thermal Expansion," the Engineering ToolBox, http://www.engineeringtoolbox.com/linear-expansion-coefficients-d 95 html, retrieved May 17, 2019, pp. 1-10 (10 pages).

P. Prabhu et al, "Improving Fracture Toughness of Glass/Epoxy Composites by Using Rubber Particles Together with Zirconium Toughened Alumina (ZTA) Nanoparticles," Research and Reviews: Journal of Engineering and Technology, Jan.— Mar., 2014, pp. 21-28, vol. 3, No. 1, (eight (8) pages).

Roylance, "Stresses in Beams," Department of Materials Science Engineering, Massachusetts Institute of Technology, Nov. 21, 2000, pp. 1-18 (18 pages).

European Third Party Communication issued in counterpart European Application No. 15856909.5 dated Jun. 27, 2019 (eight (8) pages).

Japanese-language Presentation of Publications issued in counterpart Japanese Application No. 2014-225706 dated Aug. 27, 2019 with English translation (30 pages).

Japanese-language Office Action issued in counterpart Japanese Application No. 2014-225706 dated Mar. 5, 2019 with English translation (nine (9) pages).

Japanese-language Office Action issued in Japanese Application No. 2014-225706 dated Nov. 17, 2020 with English translation (18 pages).

* cited by examiner

THERMAL AIR FLOW METER

TECHNICAL FIELD

The present invention relates to flow meters for measuring flow rates of gases to be measured and, more particularly, to a thermal air flow meter that measures an intake air amount of an internal combustion engine.

BACKGROUND ART

A thermal air flow meter for measuring a gas flow rate include a flow rate detection unit that measures the flow rate of gas and is configured to determine the flow rate of gas through heat transfer between the flow rate detection unit and the gas to be measured. The flow rate measured by the thermal air flow meter is widely used as an important control parameter in various types of devices. The thermal air flow meter is characterized by being capable of measuring the gas flow rate, e.g., mass flow rate, with relatively high accuracy compared with flow meters operating on other systems.

A need nonetheless exists for further improvement in measurement accuracy of the gas flow rate. In a vehicle in which as internal combustion engine is mounted, for example, particularly great needs exist for fuel economy and exhaust gas purification. Meeting these needs requires that an intake air mount as a major parameter of the internal combustion engine be measured with high accuracy. A thermal air flow meter that measures an amount of intake air introduced into an internal combustion engine includes a sub-passage through which part of the intake air is drawn and a flow rate detection unit disposed in the sub-passage. The flow rate detection unit performs heat transfer with the gas to be measured to thereby determine a state of the gas to be measured flowing through the sub-passage and outputs an electric signal that represents the amount of intake air introduced into the internal combustion engine. Such a technique is disclosed in, for example, JP 2011-252796 A (PTL 1).

CITATION LIST

Patent Literature

PTL 1: JP 2011-252796 A

SUMMARY OF INVENTION

Technical Problem

In the technique disclosed in PTL 1, a housing that includes a sub-passage having therein a hole in which the flow rate detection unit is to be fitted is manufactured in advance using a resin, a sensor assembly that includes the flow rate detection unit is manufactured separately from the housing, and, under a condition in which the flow rate detection unit is inserted in the hole in the sub-passage, the sensor assembly is fixed to the housing. An elastic adhesive is applied to fill a gap between the hole in the sub-passage and the flow rate detection unit and a gap in a portion in which the sensor assembly is fitted in the housing. A difference in coefficient of linear expansion involved between the adjoining parts is absorbed by an elastic force of the adhesive.

The foregoing structure, however, entails greater variations in position when the sensor assembly including the flow rate detection unit is fixed to the housing including the sub-passage. Specfically, a state of the adhesive, for example, can readily affect to vary a position and an angle of the sensor assembly with respect to the sub-passage included in the housing. Thus, the known thermal air flow meter finds difficulty in further improving accuracy in detecting the flow rate.

Fixing the sensor assembly including the flow rate detection unit simultaneously with the molding of the housing is effective in accurately positioning the flow rate detection unit with respect to the sub-passage. The foregoing approach, however, poses a problem of reduced measurement accuracy because of the following reason: specifically, thermal stress that occurs in a resistor in an LSI and that arises from the difference in the coefficient of linear expansion between parts is higher than that when the adhesive is used; additionally, heat generated in electronic components reduces accuracy in temperature correction.

An object of the invention is to provide a thermal air flow meter that offers high measurement accuracy.

Solution to Problem

In order to solve the above object, the present invention provides a thermal air flow meter including: a sub-passage through which part of a fluid to be measured is drawn; a sensor chip disposed in the sub-passage, the sensor chip measuring a flow rate of the fluid to be measured; an electronic component that includes a resistor and that converts a fluid flow rate detected by the sensor chip to a corresponding electric signal; and a substrate on which the sensor chip and the electronic component are disposed, wherein the substrate has a surface, on which the electronic component is disposed, covered with a filling material.

Advantageous Effects of Invention

According to the invention, a thermal air flow meter that offers high measurement accuracy can be provided.

DESCRIPTION OF EMBODIMENTS

Embodiments of the present invention will be described below with reference to the accompanying drawings.

First Embodiment

A thermal air flow meter according to a first embodiment of the present invention will first be described.

Figure 1:
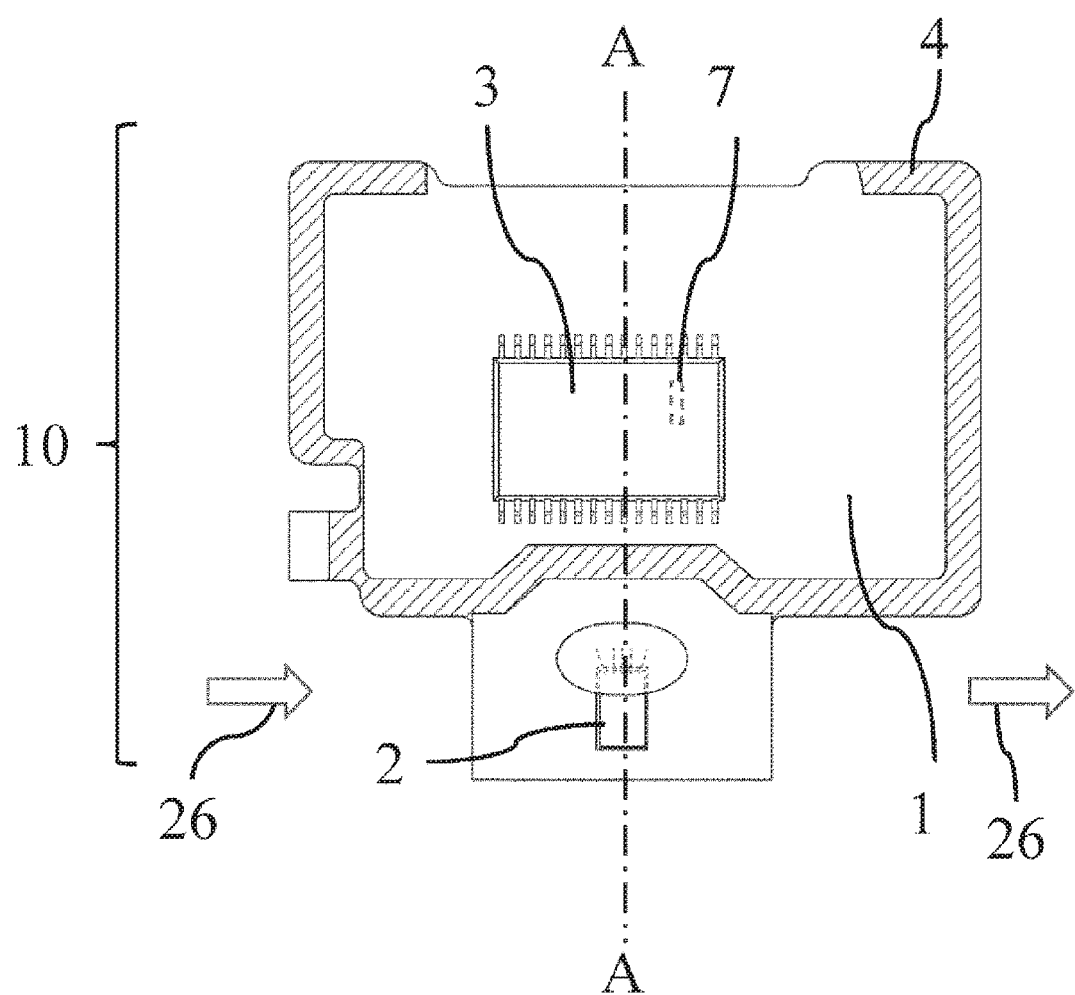
FIG. 1 is a plan view of a sensor assembly according to a first embodiment of the present application.

As shown in FIG. 1, a sensor assembly 10 includes an electronic component 3 and a sensor chip 2 mounted on a substrate 1. It is noted that a ceramic substrate or a printed substrate may be used for the substrate 1. The electronic component 3 may, for example, be an LSI. A resistor 7 is disposed inside the electronic component 3 and is used, for example, as a reference oscillator (clock) or an A/D converter. The substrate 1 and the sensor chip 2, and the substrate 1 and the electronic component 3, are each electrically wired using a solder or a bonding wire. During flow rate detection, air 26 flows from a direction of the arrow in FIG. 1 or a direction opposite thereto to pass through a flow rate detection part in the sensor chip 2, so that the flow rate is measured.

Figure 2:
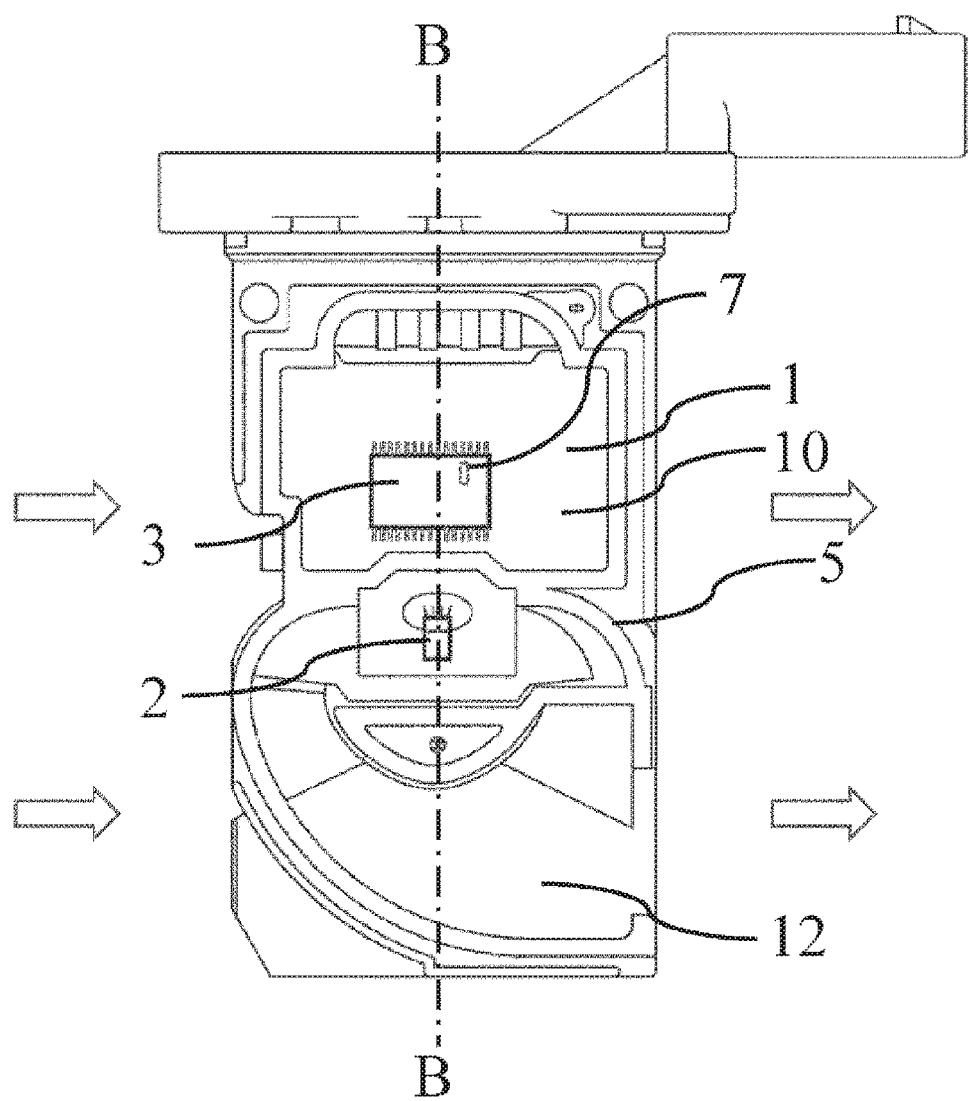
FIG. 2 is a plan view of a thermal air flow meter according to the first embodiment of the present application.

FIG. 2 is a plan view of the sensor assembly 10 mounted on a housing 5 that includes a sub-passage 12. The housing 5 includes the sub-passage 12 for introducing air that flows through a main passage to the sensor chip 2. The housing 5 formed of a first resin is integrally molded with the sensor assembly 10. The sensor assembly 10 is fixed to the housing 5 via a fixing zone 4 hatched in FIG. 1. The first resin used for the housing 5 is, for example, a thermoplastic resin. In this case, the sensor chip 2 including the flow rate detection part, being intended to measure the air flow rate, is disposed in the sub-passage 12.

Figure 3:
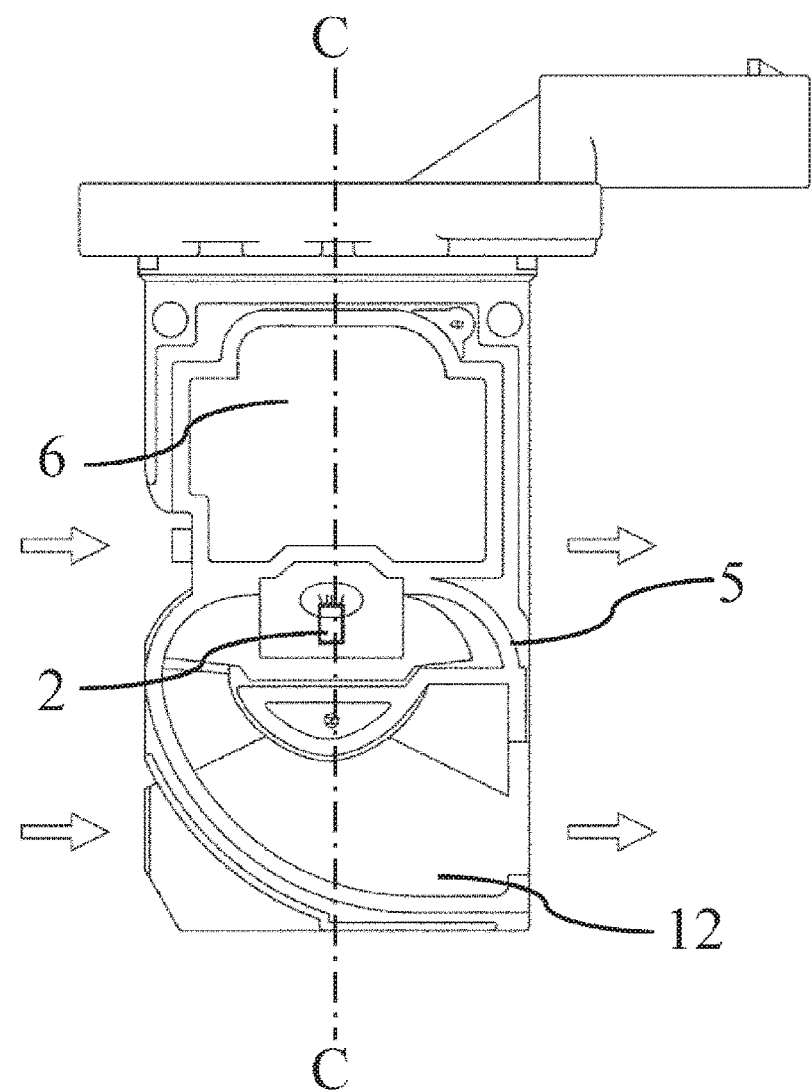
FIG. 3 is a plan view of the thermal air flow meter that has been sealed by a filling material in the first embodiment of the present application.
Figure 4:
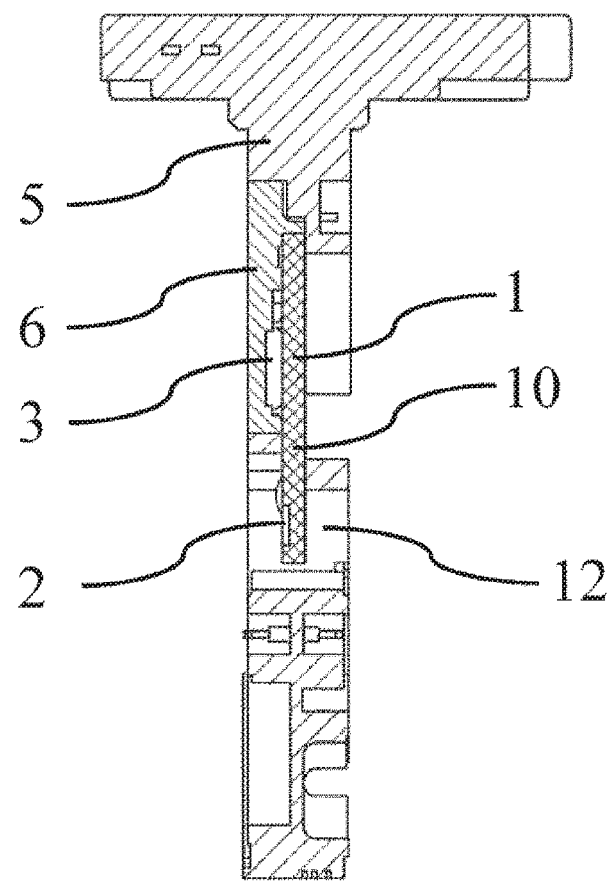
FIG. 4 is a cross-sectional view of the thermal air flow meter that has been sealed by the filling material according to the first embodiment of the present application, taken along line C-C.

FIG. 3 is a plan view of the thermal air flow meter that has been sealed by a filling material 6. FIG. 4 is a cross-sectional view taken along line C-C in FIG. 3. As shown in FIGS. 3 and 4, the filling material 6 is applied to a space formed by the sensor assembly 10 and the housing 5 so as to cover the electronic component 3. An epoxy resin, for example, is used as the filing material.

Effects of the first embodiment will be described below. During flow rate measurement, voltage is applied to the resistor 7 within the electronic component 3, so that the resistor 7 generates heat. The generation of heat increases a temperature of the thermal air flow meter to thereby increase a difference in temperature between the thermal air flow meter and an environment. This results in degraded flow rate measurement accuracy. Thus, the temperature of the thermal air flow meter needs to be prevented from increasing, as caused by the heat generated by the resistor. Covering the electronic component 3 with the filling material 6 as shown in FIG. 3 improves thermal conductivity. This causes the electronic component 3 to readily dissipate heat, so that the temperature can be prevented from increasing. In addition, the thermal air flow meter is applied to flow rate measurement in, for example, a vehicle in which an internal combustion engine is mounted, so that the thermal air flow meter is exposed to an environment containing, for example, exhaust gases, gasoline, and salt water. The covering of the electronic component 3 mounted on the sensor assembly 10 with the filling material 6 prevents the electronic component 3 from being exposed to the above environment, so that variations in characteristics of the electronic component 3 can be prevented and a thermal air flow meter offering even higher accuracy can be provided.

Second Embodiment

Figure 5:
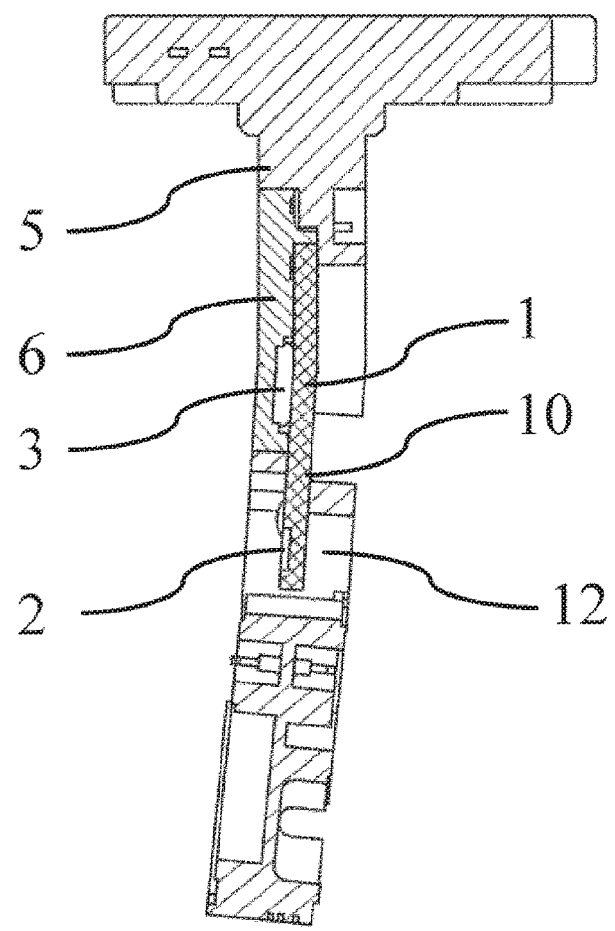
FIG. 5 is a cross-sectional view of a thermal air flow meter that has been sealed by a filling material according to a second embodiment of the present application when the thermal air flow meter is subjected to a change in temperature.
Figure 6:
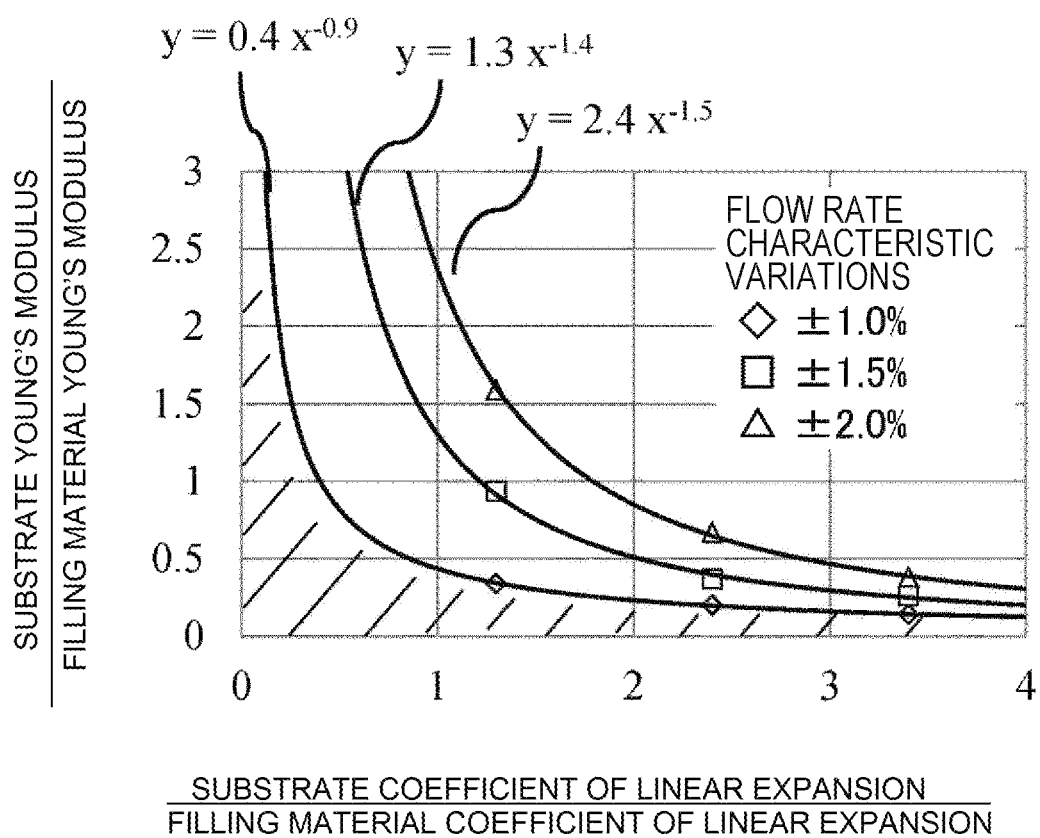
FIG. 6 is a characteristic diagram of distortion occurring in an electronic component according to the second embodiment of the present application.

A second embodiment of the present invention will be described below with reference to FIGS. 5 and 6. FIG. 5 is a cross-sectional view of a thermal air flow meter that, is subjected to a change in temperature. When an electronic component 3 on a sensor assembly 10 is covered with a filling material 6, bending deformation as shown in FIG. 5 occurs in the thermal air flow meter and a substrate 1, as caused by a difference in coefficient, of linear expansion or in resin contraction between the substrate 1 and the filling material 6. This results in stress (distortion) occurring also in a resistor 7 inside the electronic component 3. The stress (distortion) occurring in the resistor 7 causes a resistance value to be varied by a piezo effect, so that an output characteristic of the LSI 3 changes to thus affect measurement accuracy of the air flow rate. FIG. 6 represents calculations, performed through stress analysis, of variations in a flow rate characteristic caused by thermal stress encountered by the resistor 7 in the electronic component 3 with respect to a ratio of Young's modulus of the filling material 6 to Young's modulus of the substrate 1 and a ratio of a coefficient of linear expansion of the filling material 6 to a coefficient of linear expansion of the substrate 1. In FIG. 6, the ordinate (y-axis) represents the ratio of the Young's modulus of the substrate 1 to the Young's modulus of the filling material 6 and the abscissa (x-axis) represents the ratio of the coefficient of linear expansion of the filling material 6 to the coefficient of linear expansion of the substrate 1. The both ratios are non-dimensional. FIG. 6 plots the relations, as calculated using stress analysis, between the ratio of the Young's modulus of the filling material 6 to the Young's modulus of the substrate 1 and the ratio of the coefficient of linear expansion of the filling material 6 to the coefficient of linear expansion of the substrate 1 when the variations in the flow rate characteristic as caused by the thermal stress encountered by the resistor 7 are ±1.0%, ±1.5%, and ±2.0%. Additionally, using the above plot, the relation between the ratios of the coefficient of linear expansion and the Young's modulus and the variations in the flow rate characteristic is obtained through power approximation. FIG. 6 reveals that the variations in the flow rate characteristic increase with increasing ratios of the coefficient of linear expansion and the Young's modulus.

In the present embodiment, the ratios of the Young's modulus and the coefficient of linear expansion of the substrate 1 to the Young's modulus and the coefficient of linear expansion of the filling material 6 are arranged to fall within a predetermined range indicated by a hatched portion in FIG. 6. Specifically, let x be the ratio of the coefficient of linear expansion of the substrate 1 to the coefficient of linear expansion of the filling material 6 and let y be the ratio of the Young's modulus of the substrate 1 to the Young's modulus of the filling material 6; then, a relation of $y<0.4x^{-0.9}$ holds. Through these arrangements, variations in the resistance value of the resistor 7 with changing temperatures can be reduced and the variations in the flow rate characteristic can be held within ±1%. Further enhancement of the flow rate detection accuracy can thus be achieved.

Third Embodiment

Figure 7:
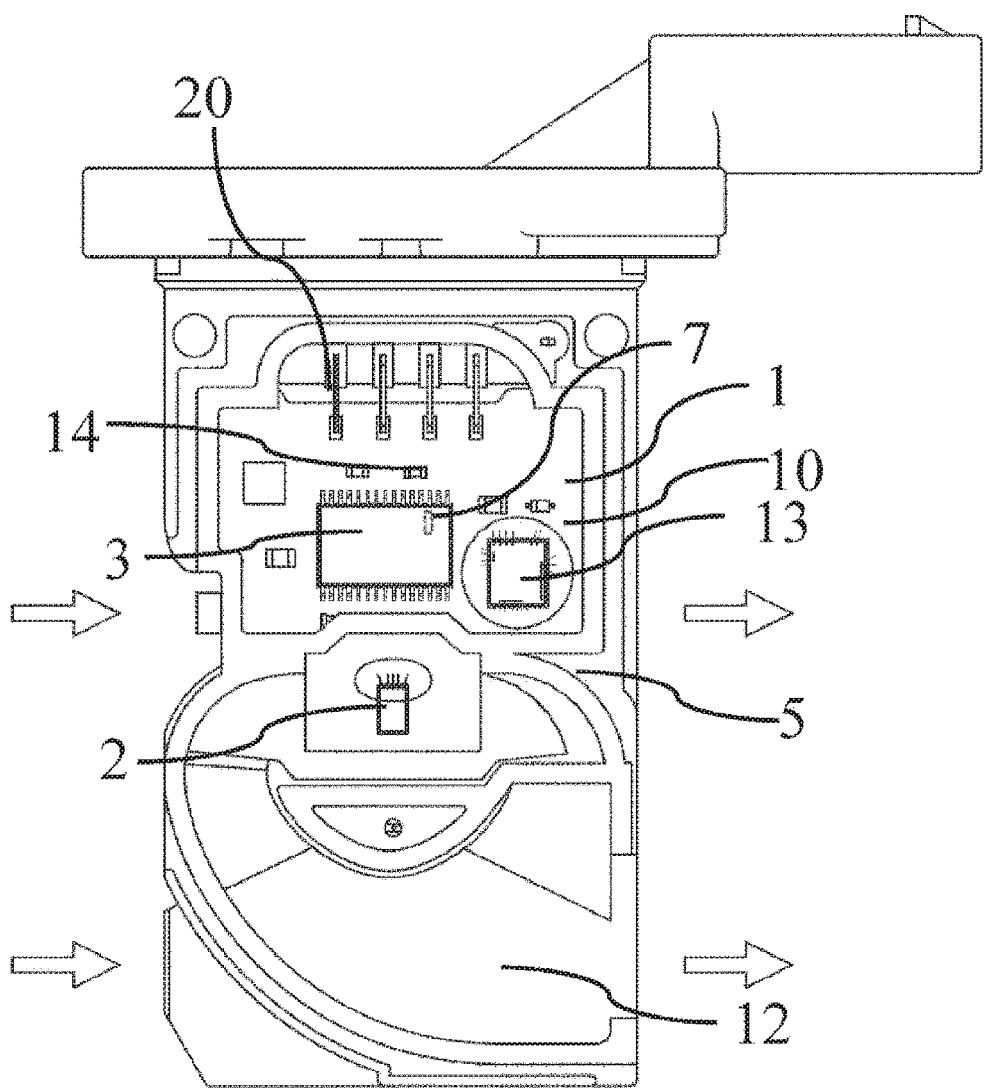
FIG. 7 is a plan view of a thermal air flow meter according to a third embodiment of the present application.
Figure 8:
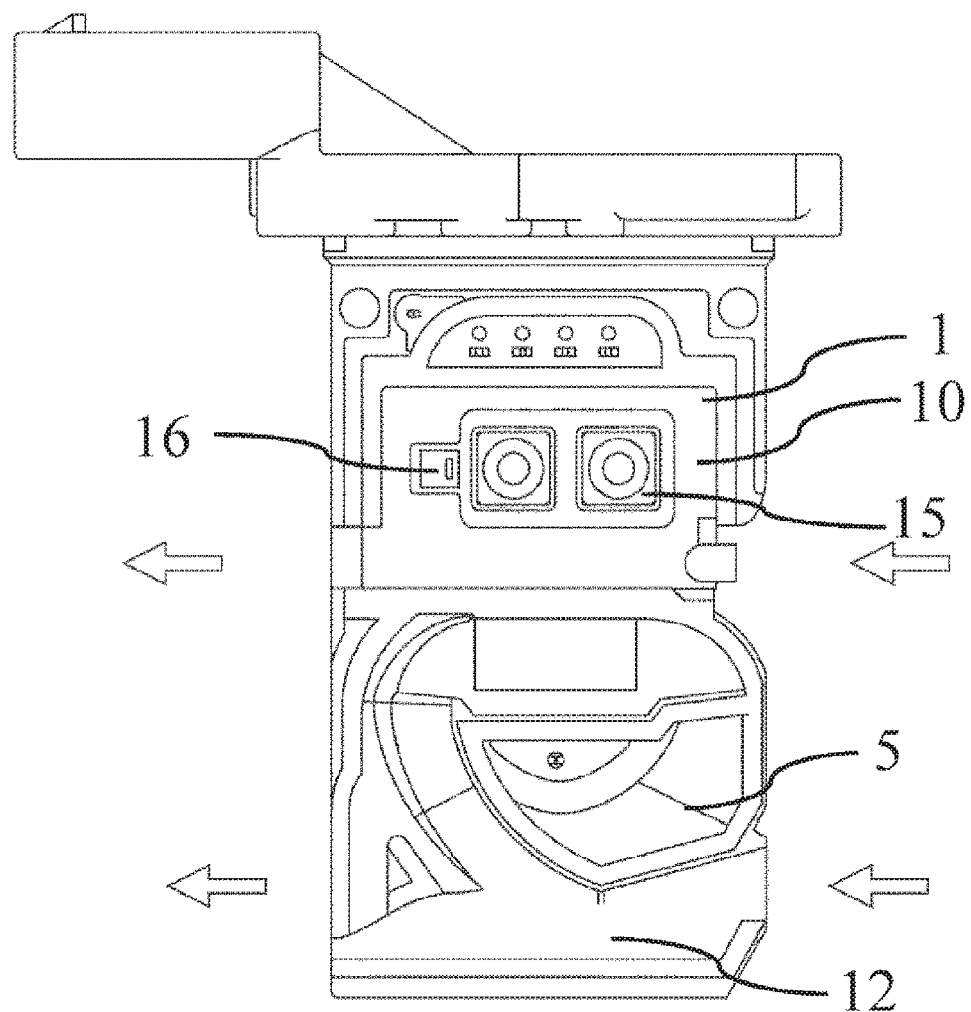
FIG. 8 is a bottom view of the thermal air flow meter according to the third embodiment of the present application.
Figure 9:
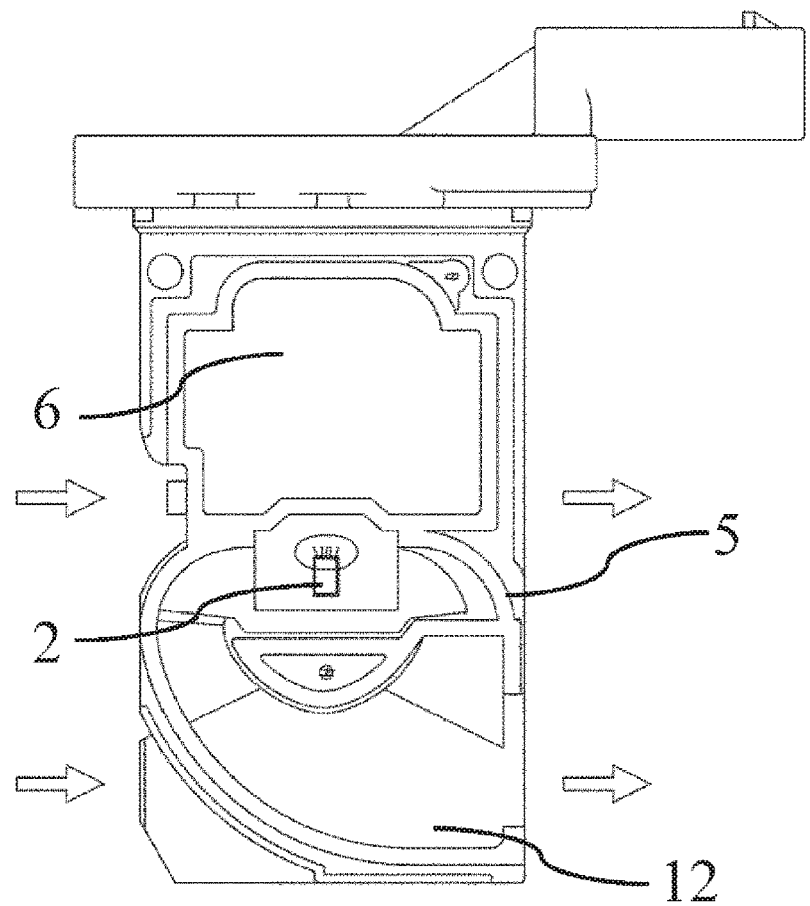
FIG. 9 is a plan view of the thermal air flow meter that has been sealed by a filling material in the third embodiment of the present application.

A third embodiment of the present invention will be described below with reference to FIGS. 7 to 9. FIG. 7 is a plan view of a thermal air flow meter in which a sensor assembly 10 is fixed to a housing 5. FIG. 8 is a bottom view. A configuration of the third embodiment differs from the preceding embodiments in that, as shown in FIGS. 7 and 8, a plurality of electronic components 13 to 16 are disposed on a substrate. Examples of the electronic components include, but are not limited to, a thermistor, a microprocessor, a pressure sensor, and a humidity sensor. As shown in FIG. 7, a bonding wire 20 is used to electrically connect the sensor assembly 10 with a connector 21 disposed in the housing. Examples of the material used for the bonding wire include, but are not limited to, Al, Au, and Cu. FIG. 9 is a plan view of the thermal air flow meter that has been sealed by a filling material 6. Understandably, the configuration shown in FIG. 9 achieves equivalent effects. Furthermore, protection provided for the bonding wire 20 by the filling material 6 can prevent the bonding wire 20 from being deformed from vibration, so that a highly reliable flow meter can be provided.

Fourth Embodiment

Figure 10:
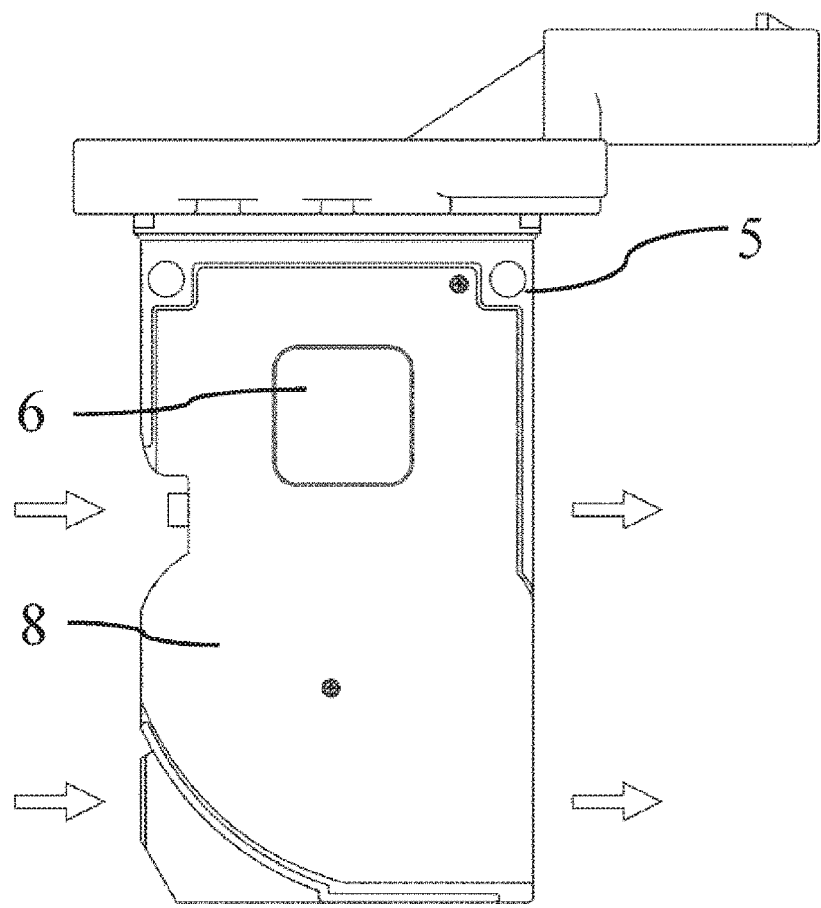
FIG. 10 is a plan view of a thermal air flow meter that has been sealed by a filling material in a fourth embodiment of the present application.

A fourth embodiment of the present invention will be described below with reference to FIG. 10.

A configuration of the fourth embodiment differs from the preceding embodiments in that a cover 8 is disposed on a housing 5 for forming a sub-passage and the cover 8 has a hole formed in at least part thereof. This results in a structure in which a filling material 6 is exposed to a main passage for a resultant greater heat dissipating effect of the filling material. Thus, further reduction in a temperature rise due to heat generated by electronic components 3 and 13 to 16 can be achieved. In addition, understandably, a structure featuring tight contact between the cover 8 and the filling material enhances a heat dissipating effect by air flow through the main passage, achieving higher accuracy.

Fifth Embodiment

A fifth embodiment of the present invention will be described below with reference to FIG. 11.

Figure 11:
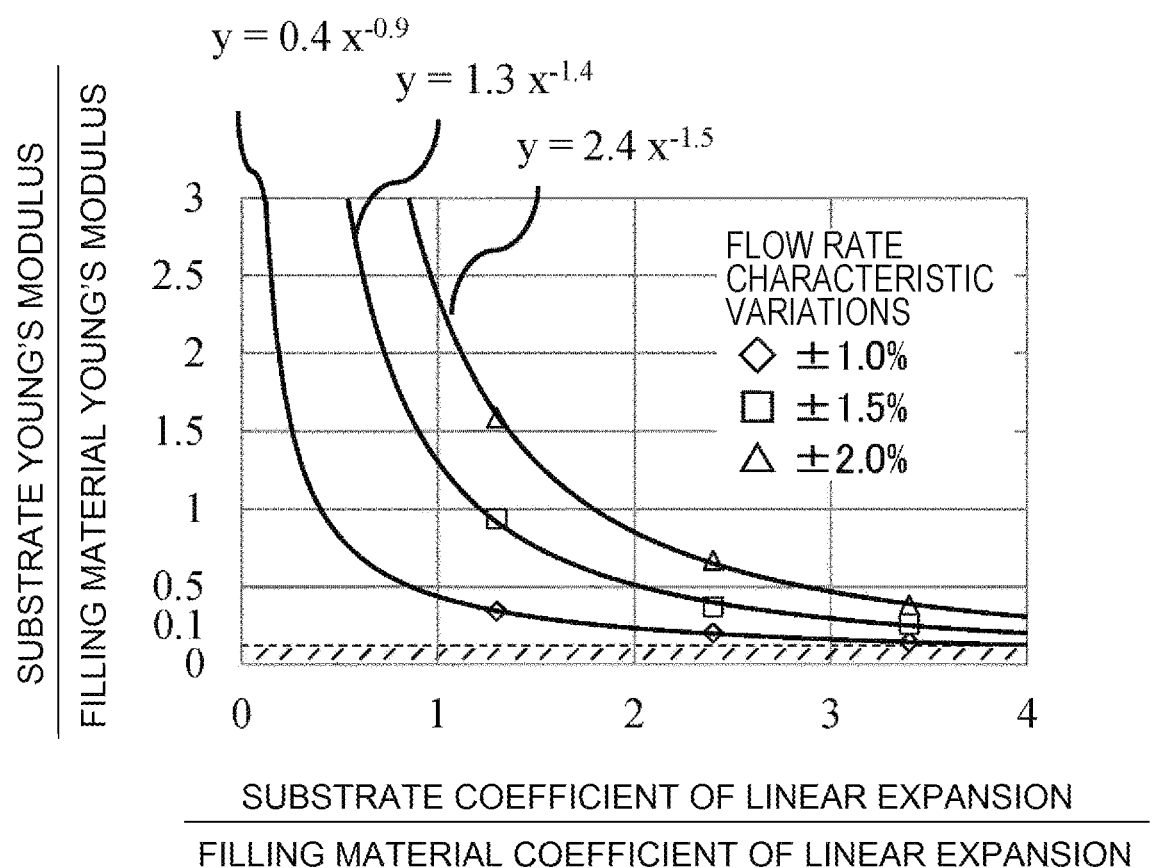
FIG. 11 is a characteristic diagram of distortion occurring in an electronic component according to a fifth embodiment of the present application.

The fifth embodiment differs from the preceding embodiments in that, as shown in FIG. 11, the relation between the ratios of the Young's modulus and the coefficient of linear expansion of the substrate 1 included in the thermal air flow meter to the Young's modulus and the coefficient of linear expansion of the filling material 6 included in the thermal air flow meter falls within a range indicated by the hatched portion in FIG. 11. Specifically, let y be the ratio of the Young's modulus of the substrate 1 to the Young's modulus of the filling material 6; then, a relation of y<0.1 holds. The electronic components 3, and 13 to 16 shown in FIGS. 7 and 8 are electrically connected with a substrate 1 using a solder or a bonding wire. Furthermore, the substrate 1 and a connector 21 disposed in a housing are electrically connected with each other using the bonding wire 20. To enhance reliability of the solder and the bonding wire in terms of thermal deformation and to achieve a long service life, preferably, the difference in coefficient of linear expansion between these bonding materials and the filling material 6 is minimized. Having the relation within the range indicated by the hatched portion in FIG. 11 enables variations in the resistance value to be held within ±1% regardless of the ratio of the coefficient of linear expansion of the substrate 1 to the coefficient of linear expansion of the filling material 6. The difference in the coefficient of linear expansion between the solder or bonding wire and the filling material can thus be minimized and variations in the resistance value can be held within ±1%, so that a highly reliable flow meter offering high accuracy can be provided.

REFERENCE SIGNS LIST 1 substrate
2 sensor chip
3 electronic component
4 fixing zone
5 housing
6 filling material
7 resistor
8 cover
10 sensor assembly
11 housing
12 sub-passage
13 to 16 electronic component
20 bonding wire
21 connector

The invention claimed is:

1. A thermal air flow meter comprising: a sub-passage through which part of a fluid to be measured is drawn; a sensor chip disposed in the sub-passage, the sensor chip measuring a flow rate of the fluid to be measured; an electronic component that includes a resistor and that converts a fluid flow rate detected by the sensor chip to a corresponding electric signal; and a substrate on which the sensor chip and the electronic component are disposed, wherein the substrate has a surface, on which the electronic component is disposed, covered with a filling material, the substrate and the filling material have a Young's modulus and coefficients of linear expansion that fall within a predetermined range that is determined by a ratio of a Young's modulus of the substrate to a Young's modulus of the filling material, and a ratio of a coefficient of linear expansion of the substrate to a coefficient of linear expansion of the filling material, the predetermined range encompasses variations in resistance of the resistor to be held within +/−1%, and the ratio of Young's modulus of the substrate to the Young's modulus of the filling material is Y, and the ratio of the coefficient of linear expansion of the substrate to the coefficient of linear expansion of the filling material is X, then a relation of $Y < 0.4 X^{-9.0}$ holds.

2. The thermal air flow meter according to claim 1, wherein at least part of the filling material is exposed to the fluid to be measured.

3. The thermal air flow meter according to claim 2, further comprising: a housing that includes a connector configured for external output and, the connector and the substrate are electrically connected with each other by wire bonding.

4. The thermal air flow meter according to claim 3, wherein the electronic component is electrically connected with the substrate by wire bonding or soldering.

5. The thermal air flow meter according to claim 1, wherein a relation of E1/E2 <0.1 holds for the predetermined range that is determined by the ratio of the Young's modulus of the substrate to the Young's modulus of the filling material, where E1 denotes the Young's modulus of the substrate and E2 denotes the Young's modulus of the filling material, the substrate is integrally molded by a housing and a first resin at a fixing zone, and the filling material is applied to a space formed by the substrate and a housing so as to cover the electronic component.

6. The thermal air flow meter according to claim 5, wherein the filling material is an epoxy resin.

7. The thermal air flow meter according to claim 6, wherein the substrate is a printed substrate.

8. The thermal air flow meter according to claim 7, wherein the housing is a thermoplastic resin.

9. The thermal air flow meter according to claim 3, wherein the filling material is applied to a space formed by the substrate and the housing so as to cover the electronic component.

\* \* \* \* \*